US006862787B2

(12) United States Patent
Groves

(10) Patent No.: US 6,862,787 B2
(45) Date of Patent: Mar. 8, 2005

(54) DEVICE FOR INSTALLING AND REMOVING VALVE STEM CORES FROM TIRE ASSEMBLIES

(75) Inventor: Walter Lee Groves, Pacific Grove, CA (US)

(73) Assignee: Soundstarts, Inc., Aromas, CA (US)

( * ) Notice: Subject to any disclaimer, the term of this patent is extended or adjusted under 35 U.S.C. 154(b) by 55 days.

(21) Appl. No.: 10/146,544

(22) Filed: May 14, 2002

(65) Prior Publication Data

US 2003/0213111 A1 Nov. 20, 2003

(51) Int. Cl.$^{7}$ .................................................. B60C 25/18
(52) U.S. Cl. ...................................................... 29/221.5
(58) Field of Search ................................ 29/221.5, 235, 29/213, 278, 280, 450, 451; 81/15.4

(56) References Cited

U.S. PATENT DOCUMENTS 2,780,944 A * 2/1957 Ondeck ...................... 475/270
3,472,083 A * 10/1969 Schnepel .................... 475/317
3,718,057 A * 2/1973 Berchtold ................... 81/15.4
5,138,909 A * 8/1992 Plyter ......................... 81/9.41
5,281,061 A * 1/1994 Ueda et al. ................. 409/144
5,406,866 A * 4/1995 Badiali ....................... 81/57.3
5,507,209 A * 4/1996 Allen et al. ................ 81/124.2
5,735,182 A * 4/1998 Wild .......................... 81/57.3
6,152,165 A * 11/2000 Fukuda .................. 137/315.41
6,612,005 B2 * 9/2003 Rivers ....................... 29/221.5

* cited by examiner

*Primary Examiner*—Robert C. Watson
(74) *Attorney, Agent, or Firm*—Donald R. Boys; Central Coast Patent Agency Inc.

(57) ABSTRACT

A tool for installing or removing a valve core in a valve stem of a tire assembly has an engagement end for physically engaging the valve core, an actuator cylinder for initiating rotation of the engagement end, and a planetary roller and shaft system for multiplying rotation from the actuator cylinder to the engagement end.

13 Claims, 5 Drawing Sheets

DEVICE FOR INSTALLING AND REMOVING VALVE STEM CORES FROM TIRE ASSEMBLIES

FIELD OF THE INVENTION

The present invention is in the field automotive tools and pertains more particularly to devices for installing and removing valve stem cores of tire assemblies.

BACKGROUND OF THE INVENTION

The automotive tooling industry encompasses a wide variety of tools for automotive repair and maintenance. Tire maintenance is arguably one of the most common procedures performed with respect to auto maintenance. Tools for tire maintenance and repair are largely manually operated. One of those tools is a valve stem core installer/remover for installing and removing valve stem cores. Valve core tools are also applicable to such as bicycle tire and motorcycle tire assemblies, and others, in addition to automobile tire assemblies.

Valve core tools have a slotted engagement end for engaging the valve core in such a way that the core may be screwed in or screwed out of the valve stem. Current hand-operated valve core tools require several complete turns, typically six turns, in order to completely remove or to completely install a valve core.

What is clearly needed is a valve core tool that can completely install or remove a valve core with substantially fewer turns. A tool such as this would provide much more efficiency in core installation and removal procedures.

SUMMARY OF THE INVENTION

In a preferred embodiment of the invention a tool for installing or removing a valve core from the stem of a tire assembly is provided, comprising an engagement end for physically engaging the valve core, an actuator cylinder for initiating rotation of the engagement end, and a planetary roller and shaft system for multiplying rotation from the actuator cylinder to the engagement end. In one embodiment the engagement end is in the shape of a fork and is adapted to be inserted into the valve stem holding the core. Also in one embodiment the engagement end is modular and can be removed from the tool and replaced with an engagement end of a different size.

In a preferred embodiment the roller and shaft system comprises at least 2 rollers mounted one each to a like number of roller shafts, the rollers making contact on their outer surfaces with the inside diameter of the actuator cylinder and with the outside diameter of a central shaft supporting the engagement end. The rollers may be manufactured of a rubber-like material and the roller shafts are fixed within the tool. In a preferred embodiment the ratio of complete turns of the engagement end is at least 6 complete revolutions of the central shaft to one complete turn of the actuator cylinder.

In another aspect of the invention, in a tool for installing or removing a valve core from a valve stem of a tire assembly, a roller and shaft system for multiplying rotation of an actuator cylinder to an engagement end is provided, comprising at least 2 fixed shafts for supporting a like number of rollers, and a central rotating shaft for supporting the engagement end. The system is characterized in that the rollers make contact with the inside diameter of the actuator cylinder and with the outside diameter of the central rotating shaft such that one revolution of the actuator cylinder produces a multiple of revolutions of the central rotating shaft supporting the engagement end.

In one embodiment the engagement end is in the shape of a fork and is adapted to be inserted onto the valve core. Also in one embodiment the engagement end is modular and can be removed from the tool and replaced with one of a different size. The rollers may be manufactured of a rubber-like material, and the roller shafts are fixed within the tool. Also in a preferred embodiment the ratio of complete turns of the engagement end is at least 6 complete revolutions of the central shaft to one complete turn of the actuator cylinder.

In an alternative embodiment of the present invention two planetary gear systems are used in a valve core tool such that the rotation direction of the central shaft and the actuator cylinder are the same. In another embodiment common direction is provided by an internal reverse-gear all arrangement.

In another aspect of the invention a tool for installing or removing a valve core in a valve stem of a tire assembly is provided, comprising a body for holding in a user's hand, an air motor in the body, an output shaft driven by the air motor, the output shaft having an engagement end for physically engaging the valve core, and a user-actuatable valve arrangement for switching air to the air motor to drive it alternately in either rotary direction. In yet another aspect a tire-changing machine is provided having a valve core tool attached thereto by a tether.

DESCRIPTION OF THE PREFERRED EMBODIMENTS

Figure 1:
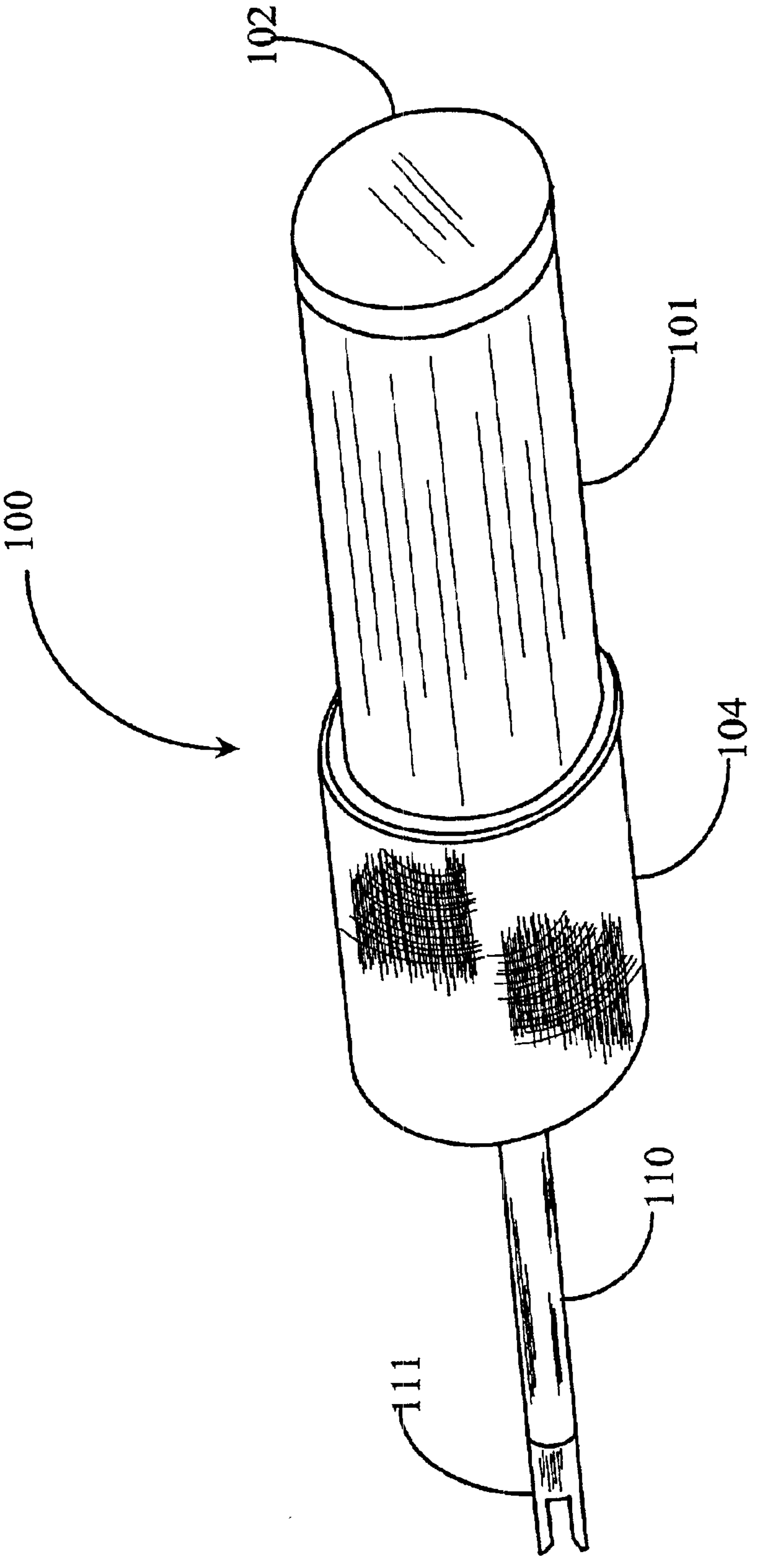
FIG. 1 is a peripheral view of a valve core tool according to an embodiment of the present invention.

FIG. 1 is a perspective view of a valve core tool 100 according to an embodiment of the present invention. Valve core tool 100 is a hand-held automotive tool used to remove and install valve cores from valve stems on tire assemblies. Tool 100 is an assembly comprising a plurality of separate components that function together to achieve the goal of the present invention, which is to enable a user to install or remove a valve core to or from a valve stem on a tire assembly with minimal turns or a single turn action imparted to the tool.

Tool 100 has a slotted core engagement fork 111 modularly attached to a rotate able shaft 110, the combination providing the core engagement portion of tool 100. Fork 111 is, in a preferred embodiment manufactured of stainless tool steel for durability. In other embodiments, other hard metals or durable materials can be incorporated to form fork 111, including plastic materials. Fork 111 is optimally designed for a specific size of valve core of which there are a few varying sizes. For example, an automotive tire assembly typically has one standard size valve stem and core, whereas a truck tire assembly supports a standard size of valve stem and core that may be larger than the automotive version. Fork 111 may be removed from shaft 110 and replaced with a fork of a different size to accommodate varying valve stem and core sizes. The mechanism of attachment of fork 111 to shaft 110 may be similar to that of a socket assembly. There are other known methods for attaching fork 111 to shaft 110, such as press fitting.

Shaft 110 is, in a preferred embodiment, manufactured of stainless steel as was described with respect to fork 111. Shaft 110 is assembled into tool 100 in a way that enables it to rotate freely in either rotational direction if imparted to do so by a user-operation of tool 100. The method of rotating shaft 110 thereby turning fork 111 in a direction to install or remove a valve core is described in detail below in this specification. Shaft 110 is cylindrical in shape while fork 111 may be cylindrical in profile with machined or ground flats provided on either side, or fork 111 may retain a cylindrical profile.

Tool 100 has a handle cylinder 101 and a removable cap 102 in a preferred embodiment, provided to form a user grip area of tool 100. Handle cylinder 101, in a preferred embodiment is hollow on the inside to provide a storage area for small parts associated with tool 100 such as spare engagement forks. Cylinder 101 may be manufactured from stainless steel or any other durable material. In one embodiment, cylinder 101 may be formed entirely of a durable polymer. Also in one embodiment, cylinder 101 may be made of stainless steel with a polymer sleeve provided to fit over the steel cylinder to enable a more comfortable grip for a user. Cap 102 and cylinder 101 may be appropriately threaded to enable secure closure. In one embodiment, cap 102 may snap or press into cylinder 101.

Tool 100 has an actuator cylinder 104 provided to cause rotation of shaft 110. Actuator cylinder 104 is mounted on tool 100 in a way such that a user may hold the tool by handle 101 and rotate cylinder 104 with fingers and thumb of the same hand. The user rotates cylinder 104 manually to cause rotation of shaft 110. The ratio of turns with respect to shaft 110 and cylinder 104 in a preferred embodiment is 6:1, meaning that shaft 110 turns 6 revolutions per one revolution of actuator cylinder 104. The ratio stated herein should not be construed as a limitation of the invention. The ratio of revolutions may be greater or less than 6:1 without departing from the spirit and scope of the present invention. The inventor concludes that installation or removal of a standard automotive valve core takes approximately 6 turns. The size difference of valve stems and cores as reflected in differing categories, say between auto and truck systems, may also reflect differing revolution requirements for installation and removal.

The internal mechanism that enables the ratio of revolutions between cylinder 104 and shaft 110 is described in the following text with reference to FIG. 2.

Figure 2:
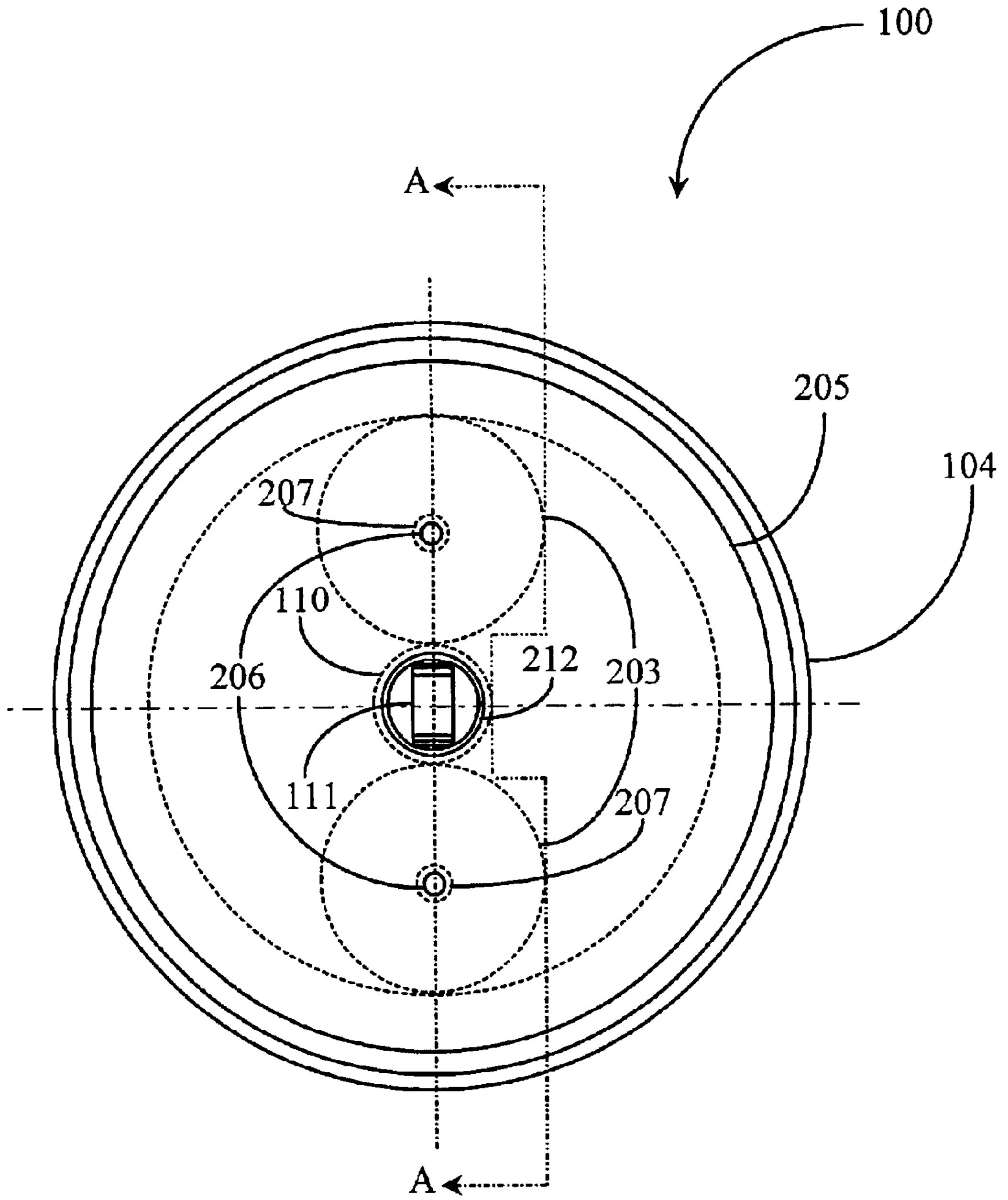
FIG. 2 is a face-on view of the tool of FIG. 1.

FIG. 2 is a face-on view of tool 100 of FIG. 1 illustrating internal components in dotted outline. Elements illustrated in this example of tool 100 that are the same elements illustrated in the example of FIG. 1 above retain the same element numbers. Tool 100 has an end cap or frame member 205 provided for the purpose of anchoring roller shafts illustrated herein as roller shafts 206 (2 per assembly). Shafts 206 are identical and therefore retain the same element number.

Shafts 206 are, in a preferred embodiment, manufactured of stainless steel, as is end cap 205. However in other embodiments, other durable materials may be used. Engagement fork 111 and shaft 110 introduced with reference to FIG. 1 extend through cap 205 by way of an opening provided therein and adapted for the purpose with provision of a bushing illustrated herein as bushing 212. Bushing 212 is, in a preferred embodiment, manufactured of Teflon or other known bushing materials and is adapted to enable free rotation of shaft 110 centered through the opening of end cap 205. It is noted herein that shaft 110 actually has 2 outside diameters as seen in this view. One smaller diameter that extends through end cap 205 and a slightly larger diameter that is presented within the enclosure formed by actuator 104 and end cap 205, the larger diameter represented by a dotted circle.

Actuator cylinder 104 is hollow and therefore has an inside diameter represented herein by a large dotted circle. The inside wall of actuator cylinder 104 makes intimate and persistent contact with a pair of rollers 203 provided within tool 100 and adapted to retain a mounted position on fixed roller shafts 206. Rollers 203 are, in a preferred embodiment, formed of a rubber-like material for desired friction properties. Rollers 203 are enabled to rotate around fixed shafts 206 by way of 2 bearing tubes illustrated herein as the smallest dotted circles given the element number 207. There is one bearing tube 207 for each roller 203. Bearing tubes 207 are preferably tubes formed of Teflon however, in other embodiments other materials may be used as long as the friction coefficient is low.

Rollers 203 also make intimate and persistent contact with shaft 110, which supports engagement fork 111. The simultaneous contact between rollers 203 and the inside wall of actuator cylinder 104 and between rollers 203 and shaft 110 forms the driving mechanism for turning engagement end 111 by applying turning force to actuator cylinder 104. Rollers 203 are mounted in reasonably compressed condition so as to retain optimum frictional traction for driving shaft 110. Given the planetary arrangement of the system as illustrated, rotation of actuator cylinder 104 in a counterclockwise direction results in a clockwise rotation of shaft 110 and therefore engagement fork 111. Similarly, clockwise rotation of cylinder 104 produces counterclockwise rotation of the engagement fork. In one embodiment of the present invention, the inside wall surface of actuator cylinder 104 and the surface of shaft 110 is knurled so that rollers 203 have optimum grip against the surfaces.

The inside diameter of actuator cylinder 104 is N times the diameter of shaft 110, defining the of revolutions of shaft 110 compared to cylinder 104. In most embodiments, a ration of 6:1 is preferred. The formula C=D, where C is circumference, is used to derive the appropriate ratio of revolutions with regard to actuator cylinder 104 and shaft 110. For example, if the inside diameter of cylinder 104 is 1.5 inches then a diameter of shaft 110 of 0.25 inches produces the desired 6:1 ratio. Therefore, tool 100 would be manufactured of differing dimensions with respect to cylinder 104 and shaft 110 in order to achieve different ratios if desired. In this example, a user may turn actuator cylinder 104 one complete revolutions in order to achieve 6 complete revolutions of shaft 110, and a standard valve core could therefore be installed or removed in one revolution of cylinder 104.

In an alternative embodiment a double planetary is used to provide a common rotary direction for cylinder 104 and shaft 110. In yet another embodiment the common rotation direction is provided by a reverse-gearing arrangement internally.

Figure 3:
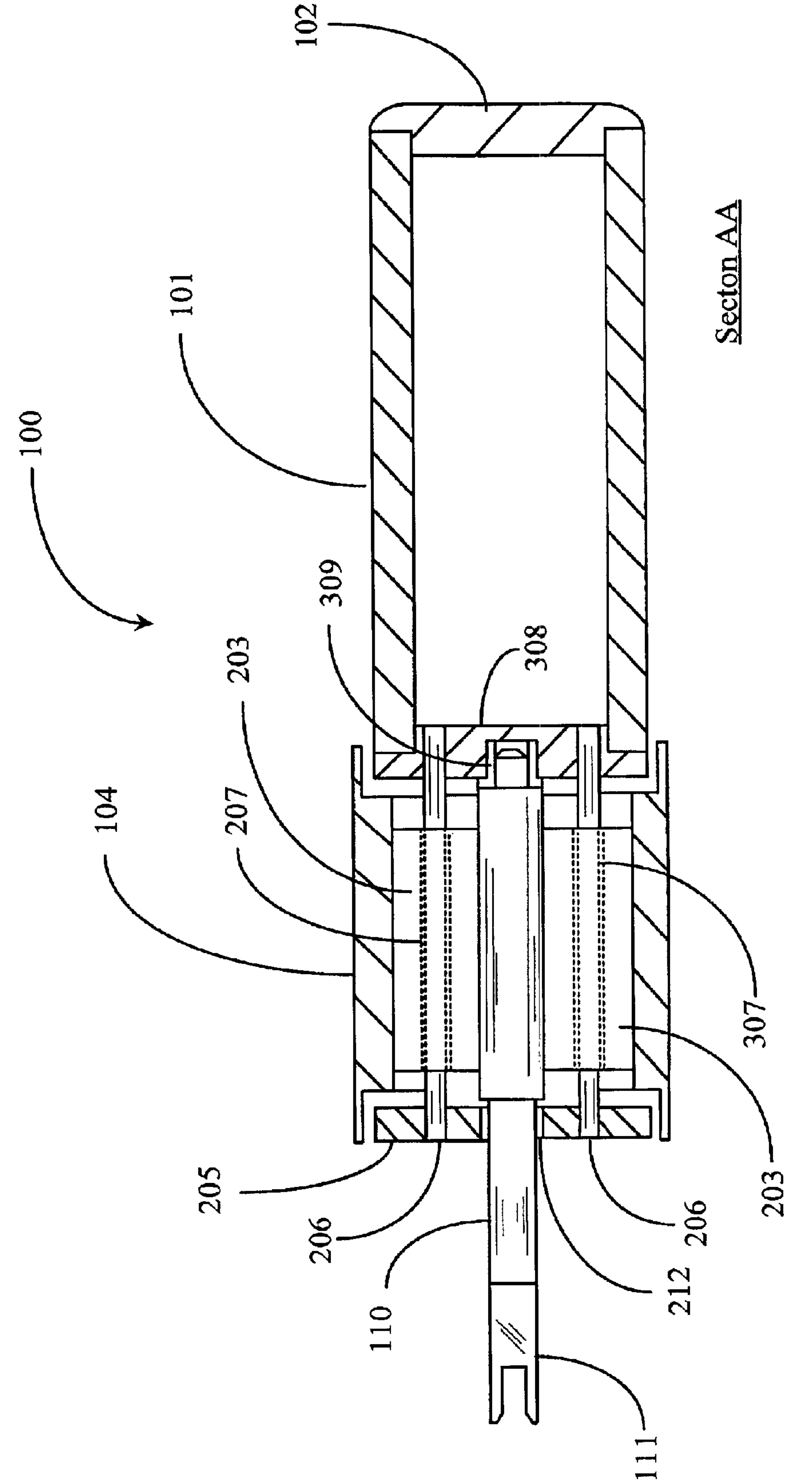
FIG. 3 is a section view of the tool of FIG. 2 taken along the section lines A–A.

FIG. 3 is a section view of tool 100 of FIG. 2 taken generally along the section lines A–A of FIG. 2. Elements present in this example that are also present in the examples of FIG. 1 and/or FIG. 2 above retain the same element numbers.

Handle cylinder 101 has an end cap 308 affixed thereto and facing the engagement end of tool 100. End cap 308 is in a preferred embodiment, manufactured of stainless steel. In other embodiments other hard and durable materials can be used. In one embodiment, end cap 308 is a contiguous part of handle 101. In another embodiment, end cap 308 is threaded into handle 101. In still another embodiment end cap 308 may be welded to handle cylinder 101.

End cap 308 is a base for seating shafts 206, which support rollers 203 in the assembly. Shafts 206 are pressed into cap 308 in a fixed manner so that they do not rotate or move. End cap 308 has a Teflon bushing provided therein adapted to seat shaft 110 so that it may rotate freely while seated in end cap 308. End cap 205 provides support and stability at the opposite end by providing a seat for shafts 206 and for shaft 110. It is noted herein that bushing 212 set in end cap 205 supports shaft 110. This particular configuration allows shaft 110 to rotate with minimum friction. Shaft 110 is slightly larger in diameter within the enclosure formed by handle cylinder 101 and end caps 205 and 308. The increased diameter retains shaft 110 into its seated position within tool 100. In this example handle 101, caps 308 and 205, and shafts 206 are a fixed frame assembly.

It will be apparent to one with skill in the art that tool 100 can be adapted to install or remove any size of valve core by providing an appropriate engagement end for the task. The actual number of turns a user must apply to actuator cylinder 104 may, in some embodiments be more than one, if, for example, a style of valve core requires more turns than the number reflected by the ratio of the particular tool. For this example a core requiring 6 complete turns can be removed or installed by one turn of cylinder 104. Tool 100 may be adapted for any requirement by manipulating the dimensions of shaft 110 and the inside diameter of cylinder 104.

Figure 4:
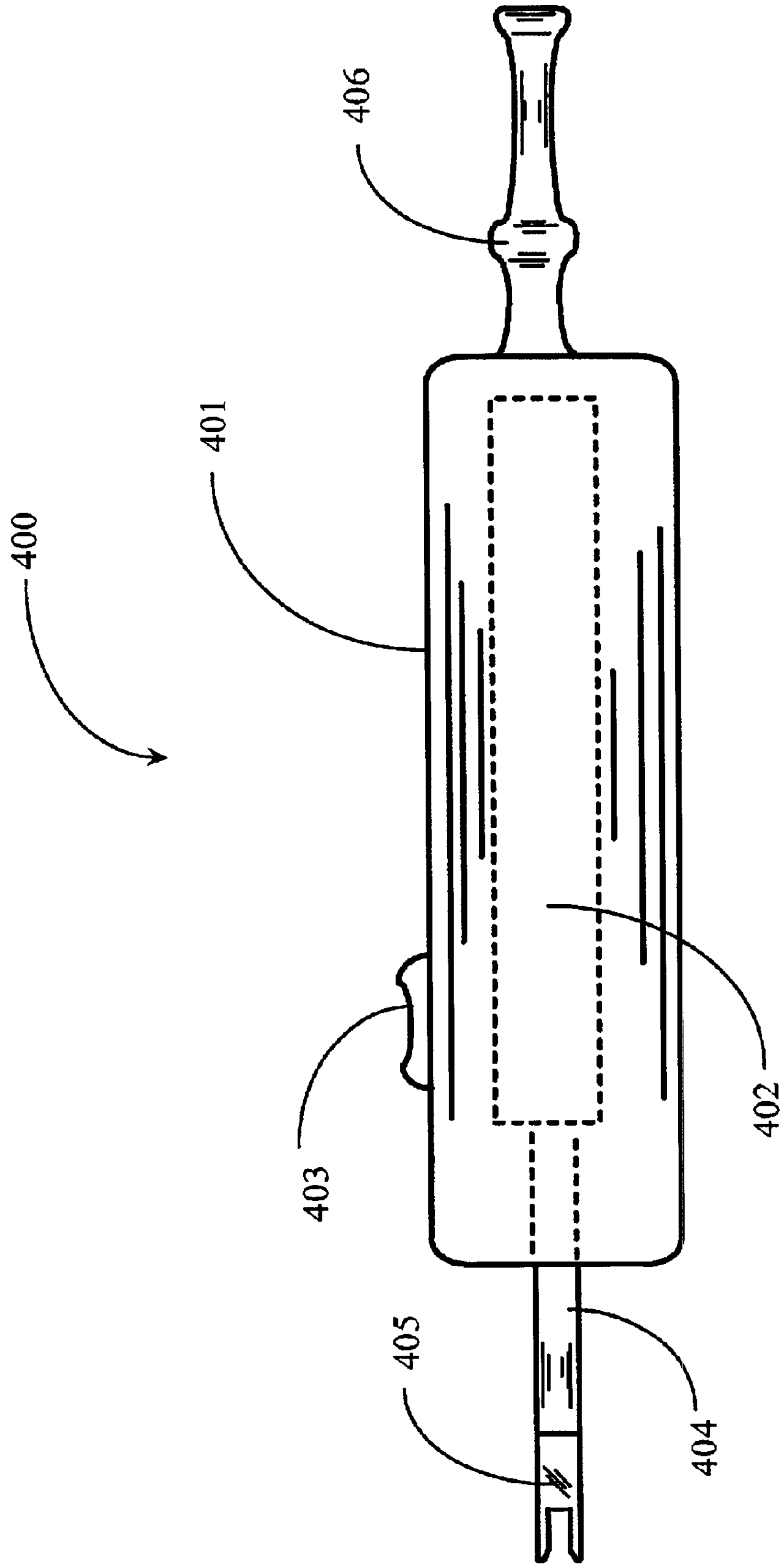
FIG. 4 is an elevation view of a valve core tool in an alternative embodiment of the present invention.

FIG. 4 is an illustration of a core tool 400 according to an alternative embodiment of the present invention. In this embodiment an air motor 402 operates within a housing 401 to turn a shaft 404 in either rotary direction as determined by a user-operable rocker switch 403. A core tool engagement end 405 is affixed to the free end of shaft 404 for engaging a valve stem core. Pneumatic drive motors are well-known in the art, as are switches that may be used for controlling on-off and direction of rotation. Preferably end 405 can be removed and replaced by an end of a different size. Element 406 represents a standard engagement core for a pneumatic quick-coupling.

Figure 5:
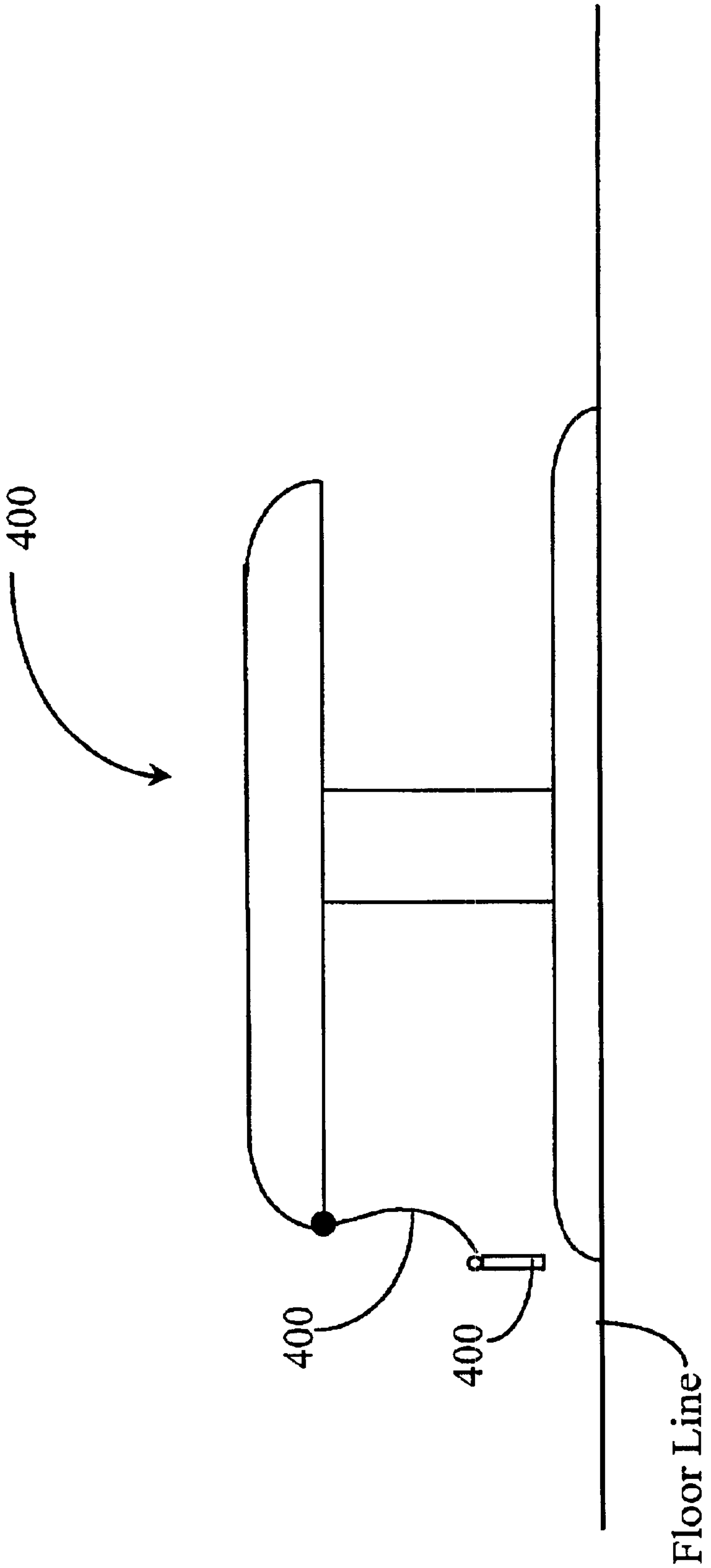
FIG. 5 is a largely schematic elevation view of a tire-changing machine including a valve core tool of either the type shown in FIG. 1 or that of FIG. 4.

FIG. 5 is a largely schematic elevation view of a tire changing machine 501 as known in the art, but having a core tool 502 attached thereto by a cable, chain, or other tether 503, for use by workers using the tire-changing machine. In this system the core tool an be either the tool of FIG. 1 of that of FIG. 4.

The method and apparatus of the invention should be afforded the broadest possible scope under examination. The spirit and scope of the invention should be limited only by the claims that follow.

What is claimed is:

1. A tool for installing or removing a valve core in a valve stem of a tire assembly comprising:

an engagement end for physically engaging the valve core;

an actuator cylinder for initiating rotation of the engagement end; and a planetary roller and shaft system for multiplying rotation from the actuator cylinder to the engagement end;

wherein the engagement end is modular and can be removed from the tool and replaced with an engagement end of a different size.

2. The tool of claim 1 wherein the engagement end is in the shape of a fork and is adapted to engage the valve core.

3. The tool of claim 1 wherein the roller and shaft system comprises at least 2 rollers mounted one each to a roller shaft, the rollers each having an outer surface and making contact on their outer surfaces with an inside diameter of the actuator cylinder and with an outside diameter of a central shaft supporting the engagement end.

4. The tool of claim 3 wherein the rollers are manufactured of a rubber-like material and the roller shafts are fixed within the tool.

5. The tool of claim 3 wherein the ratio of complete turns of the engagement end is at least 6 complete revolutions of the central shaft to one complete turn of the actuator cylinder.

6. In a tool for installing or removing a valve core in a valve stem of a tire assembly, a roller and shaft system for multiplying rotation of an actuator cylinder to an engagement end, comprising:

at least 2 fixed shafts, each one supporting an individual roller; and a central rotating shaft for supporting the engagement end;

characterized in that the rollers make contact with an inside diameter of the actuator cylinder and with an outside diameter of the central rotating shaft such that one revolution of the actuator cylinder produces a multiple of revolutions of the central rotating shaft supporting the engagement end.

7. The roller and shaft system of claim 6 wherein the engagement end is in the shape of a fork and is adapted to be inserted onto the valve core.

8. The roller and shaft system of claim 6 wherein the engagement end is modular and can be removed from the tool and replaced with one of a different size.

9. The roller and shaft system of claim 6 wherein the rollers are manufactured of a rubber-like material and the shafts are fixed within the tool.

10. The roller and shaft system of claim 6 wherein the ratio of complete turns of the engagement end is at least 6 complete revolutions of the central shaft to one complete turn of the actuator cylinder.

11. The tool of claim 10 wherein two planetary gear systems are used such that the rotation direction of the central shaft and the actuator cylinder are the same.

12. The tool of claim 1 wherein an internal reverse-gear arrangement causes common rotation direction for the actuator cylinder and the central shaft.

13. A tool for installing or removing a valve core in a valve stem of a tire assembly comprising:

a body for holding in a user's hand;

an air motor in the body;

an actuator cylinder connected to an output shaft driven by the air motor, the output shaft having an engagement end for physically engaging the valve core;

a planetary roller and shaft system for multiplying rotation from the actuator cylinder to the output shaft; and a user-actuatable valve arrangement for switching air to the air motor to drive it alternately in either rotary direction.

* * * * *